US009219618B2

(12) United States Patent
Sakui et al.

(10) Patent No.: US 9,219,618 B2
(45) Date of Patent: Dec. 22, 2015

(54) INFORMATION PROCESSING SYSTEM, INFORMATION PROCESSING DEVICE, MANAGEMENT TERMINAL DEVICE, AND COMPUTER READABLE MEDIUM

(71) Applicant: PFU LIMITED, Kahoku-shi, Ishikawa (JP)

(72) Inventors: Masahito Sakui, Kahoku (JP); Yoshinobu Araya, Kahoku (JP); Yoshihisa Taira, Kahoku (JP)

(73) Assignee: PFU LIMITED, Ishikawa (JP)

( * ) Notice: Subject to any disclaimer, the term of this patent is extended or adjusted under 35 U.S.C. 154(b) by 105 days.

(21) Appl. No.: 13/749,520

(22) Filed: Jan. 24, 2013

(65) Prior Publication Data

US 2013/0230044 A1 Sep. 5, 2013

(30) Foreign Application Priority Data

Mar. 2, 2012 (JP) .................................. 2012-047032

(51) Int. Cl.
*H04L 12/54* (2013.01)
*H04L 12/26* (2006.01)
*H04L 12/24* (2006.01)

(52) U.S. Cl.
CPC ............... *H04L 12/56* (2013.01); *H04L 41/06* (2013.01); *H04L 41/12* (2013.01); *H04L 43/0817* (2013.01)

(58) Field of Classification Search
None
See application file for complete search history.

(56) References Cited

U.S. PATENT DOCUMENTS

| 7,093,163 | B2 * | 8/2006 | Kameyama et al. | ............ 714/21 |
| 7,103,028 | B1 | 9/2006 | Yasue et al. | |
| 7,487,390 | B2 * | 2/2009 | Saika | .............................. 714/13 |
| 7,995,564 | B1 * | 8/2011 | Boudreaux et al. | ........... 370/352 |
| 8,151,080 | B2 * | 4/2012 | Naganuma et al. | ........... 711/173 |

(Continued)

FOREIGN PATENT DOCUMENTS

| CN | 1243370 A | 2/2000 |
| CN | 1933427 A | 3/2007 |

(Continued)

OTHER PUBLICATIONS

Notification of Reasons for Refusal Japanese Patent Application No. 2012-047032 dated Apr. 7, 2015 with English translation.

(Continued)

*Primary Examiner* — Huy D Vu
*Assistant Examiner* — Hong Shao
(74) *Attorney, Agent, or Firm* — McDermott Will & Emery LLP

(57) ABSTRACT

There is provided an information processing system comprising: an information processing device; and a terminal management device that manages the information processing device, wherein: the information processing device has: a transmission section that transmits notification data denoting at least an operating state to the terminal management device; and a switch section that switches a notification destination of the notification data transmitted from the transmission section, based on return information for the notification data; and the terminal management device has: a return section that sends back the return information in response to the notification data transmitted from the information processing device; and a notification destination information insertion section that inserts notification destination change information for changing the notification destination of the notification data into the return information sent back by the return section.

12 Claims, 7 Drawing Sheets

(56) References Cited

U.S. PATENT DOCUMENTS 8,589,550 B1 * 11/2013 Faibish et al. .............. 709/226
2007/0294380 A1 12/2007 Natarajan et al.

FOREIGN PATENT DOCUMENTS

| CN | 101938524 A | 1/2011 |
|---|---|---|
| JP | 2001-282642 A | 10/2001 |
| JP | 2005-141391 A | 6/2005 |
| JP | 2006-099556 A | 4/2006 |
| JP | 2007-334898 A | 12/2007 |
| JP | 2011-150587 A | 8/2011 |
| WO | 2011/070607 A1 | 6/2011 |

OTHER PUBLICATIONS

Decision of Refusal Japanese Patent Application No. 2012-047032 dated Jun. 30, 2015 with English translation.
English Translation First Notification of Reasons for Refusal Chinese Patent Application No. 201310066680.2 dated Sep. 14, 2015.

* cited by examiner

Task information return processing for client (S70)

Task application processing for client (S80)

INFORMATION PROCESSING SYSTEM, INFORMATION PROCESSING DEVICE, MANAGEMENT TERMINAL DEVICE, AND COMPUTER READABLE MEDIUM

CROSS-REFERENCE TO RELATED APPLICATIONS

This application is based on and claims priority under 35 USC 119 from Japanese Patent Application No. 2012-47032 filed Mar. 2, 2012.

FIELD

The invention relates to an information processing system, an information processing device, a management terminal device, and a computer readable medium.

BACKGROUND

JP2007-334898 (A1) discloses a data delivery system including a reception section that receives request information having identification data of a plurality of clients from the clients in a predetermined period, a testing section that identifies the plurality of clients by using the identification data, an alarm section that generates an alarm signal about the clients that have not dispatched the request information in the predetermined period, a generation section that generates response data for an arbitrary one of the clients that is identified by the testing section, and a transmission section that transmits the response data to the arbitrary client.

SUMMARY

According to an aspect of the invention, there is provided an information processing system comprising: an information processing device; and a terminal management device that manages the information processing device, wherein: the information processing device has: a transmission section that transmits notification data denoting at least an operating state to the terminal management device; and a switch section that switches a notification destination of the notification data transmitted from the transmission section, based on return information for the notification data; and the terminal management device has: a return section that sends back the return information in response to the notification data transmitted from the information processing device; and a notification destination information insertion section that inserts notification destination change information for changing the notification destination of the notification data into the return information sent back by the return section.

According to another aspect of the invention, there is provided an information processing system comprising: an information processing device; and a terminal management device that manages the information processing device, wherein: the information processing device has: a transmission section that transmits notification data denoting at least an operating state to the terminal management device; a switch section that switches an access destination based on return information for the notification data transmitted from the transmission section; and a task application section that acquires information which is used in execution of a task from the access destination switched by the switch section; and the terminal management device has: a return section that sends back return information for the notification data transmitted from the information processing device; and a notification destination information insertion section that inserts notification destination change information for changing the access destination into the return information sent back by the return section.

According to another aspect of the invention, there is provided an information processing device comprising: a transmission section that transmits notification data denoting at least an operating state to a terminal management device; and a switch section that switches a notification destination server of the notification data transmitted from the transmission section, based on return information for the notification data.

According to another aspect of the invention, there is provided a terminal management device comprising: a return section that sends back return information in response to notification data which denotes an operating state transmitted from an information processing device; and a notification destination information insertion section that inserts notification destination change information for changing a notification destination of the notification data, into the return information.

According to another aspect of the invention, there is provided a terminal management device comprising: a return section that sends back return information in response to notification data which denotes an operating state transmitted from an information processing device; and a notification destination information insertion section that inserts download destination information which specifies a download site of a data file, into the return information sent back by the return section.

According to another aspect of the invention, there is provided a non-transitory computer-readable medium storing thereon a computer program that causes a computer to perform the steps of: transmitting notification data which denotes at least an operating state; and switching a notification destination of the notification data based on return information for the transmitted notification data.

According to another aspect of the invention, there is provided a non-transitory computer-readable medium storing thereon a computer program that causes a computer to perform the steps of: inserting notification destination change information for changing a notification destination of notification data into return information in response to notification data received from an information processing device; and sending back the return information in which the notification destination change information is inserted.

BRIEF DESCRIPTION OF DRAWINGS

Exemplary embodiments of the present invention will be described in detail based on the following figures.

DESCRIPTION OF EMBODIMENT

The following will describe an embodiment of the invention with reference to the drawings.

Figure 1:
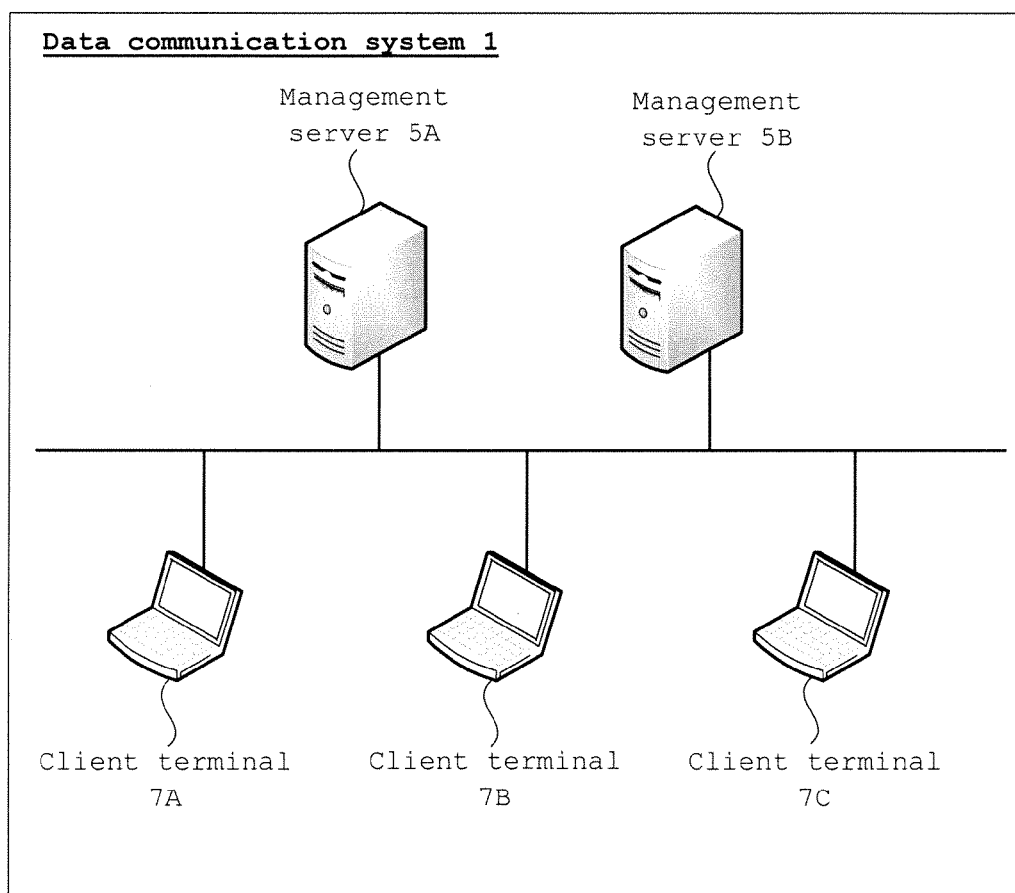
FIG. 1 is an explanatory diagram of an outline of a data communication system 1.

FIG. 1 is an explanatory diagram of the outline of a data communication system 1.

As illustrated in FIG. 1, the data communication system 1 of the present embodiment has management servers 5A to 5B and client terminals 7A to 7C.

The management server 5 is one example of a terminal management device according to the invention. The management server 5 is a computer terminal and has server functions.

The client terminal 7 is one example of an information processing device according to the invention. The client terminal 7 is a computer terminal and connected via a network to the management server 5. The client terminal 7 may be, for example, a scanner or an information terminal or ATM machine disposed to various spots and is a target to be managed by the management server 5.

For example, between the management server 5 and the client terminal 7, a firewall etc. is established to allow conducting only some communications such as http-based and https-based communications from the client terminal 7 to the management server 5.

The client terminal 7 of the present example periodically transmits a heartbeat to the management server 5 by utilizing http communication, so that the management server 5 monitors an operating state (active or inactive state) of the client terminal 7 through the firewall. The term "heartbeat" here refers to one example of communication data according to the invention and is a signal which is used by the client terminal 7 to notify the management server 5 of the operating state.

Figure 2:
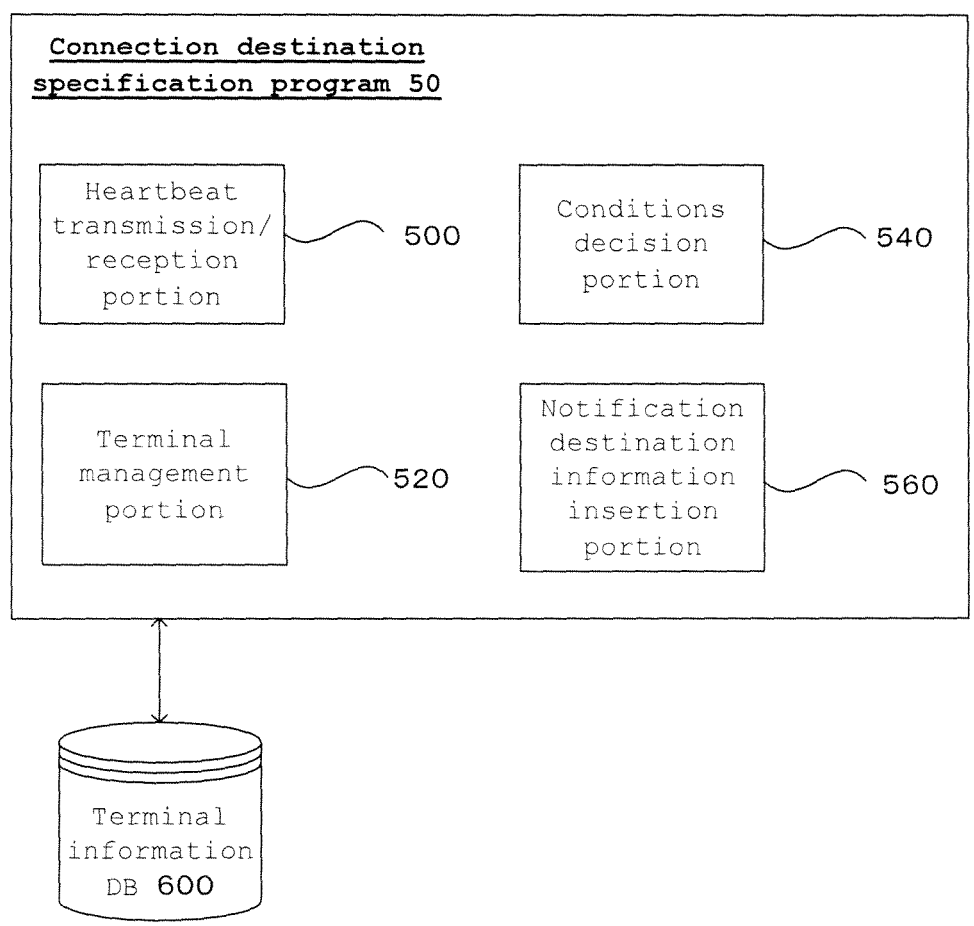
FIG. 2 is an explanatory diagram of a configuration of a connection destination specification program 50 of the data communication system 1.

FIG. 2 is an explanatory diagram of the configuration of a connection destination specification program 50 of the data communication system 1.

As illustrated in FIG. 2, the connection destination specification program 50 has a heartbeat transmission/reception portion 500, a terminal management portion 520, a conditions decision portion 540, and a notification destination information insertion portion 560.

The connection destination specification program 50 is installed to the management server 5 via a recording medium such as a CD-ROM, for example.

The heartbeat transmission/reception portion 500 sends back return information in response to notification data from the client terminal 7. Specifically, the heartbeat transmission/reception portion 500 receives a heartbeat transmitted from the client terminal 7. Moreover, the heartbeat transmission/reception portion 500 transmits the return information for the heartbeat to the client terminal 7.

More specifically, the heartbeat transmission/reception portion 500 notifies the terminal management portion 520 of the heartbeat received from the client terminal 7. Further, the heartbeat transmission/reception portion 500 transmits the information posted by the notification destination information insertion portion 560 to the client terminal 7 as the return information for the heartbeat.

The terminal management portion 520 manages terminal management information which is used to manage the terminals. The terminal management information includes identification information (MAC address etc.) of the client terminal 7 to be managed, task information about a task to be performed by the client terminal 7, and notification-data notification destination information which specifies a destination to which a heartbeat is switched.

Moreover, the terminal management portion 520 updates the terminal management information about the client terminal 7 which is a success-or-failure notification transmission source in accordance with the contents of a success-or-failure notification (to be described later) posted from the client terminal 7.

Specifically, the terminal management portion 520 updates a terminal management information table stored in a terminal information DB600. Further, the terminal management portion 520 acquires information necessary for management of the terminals from the terminal management information table. The terminal management information table includes, as the terminal management information, an MAC address serving as unique management terminal information, an IP address serving as the notification-data notification destination information for the management terminal related to the management terminal information, and task information related to the management terminal. Further, the task information includes task file download destination information which specifies a download site of a data file necessary in execution of a task and task-related information serving as attribute information of the task. The task file download destination information includes an IP address of a task file download destination and a communication method to a task file download destination. The communication method may be, for example, a protocol such as http, https, or ftp. The task-related information includes a task file name, a size, or order in which a plurality of task files is applied.

The notification-data notification destination information for the terminal management information is manually and directly registered to the management server 5A by a manager beforehand. Further, the task information is registered by the manager to the management server 5A.

In the present example, the terminal management portion 520 updates the terminal management information table based on the operating state of the client terminal 7A received from the heartbeat transmission/reception portion 500, thereby checking whether there is any information to be returned to the client terminal 7A. If there is some information to be returned, the terminal management portion 520 acquires the return information from the terminal management information table and posts it to the notification destination information insertion portion 560. The information to be returned may be notification-data notification destination information (switching destination management server's IP address etc.) or task information (data file download site's IP address etc.).

Further, the terminal management portion 520 updates the terminal management information table based on success or failure of the heartbeat posted from the client terminal 7A, results of downloading a data file required in the task, and results of applying the task.

The conditions decision portion 540 determines timing for inserting notification destination information in accordance with conditions which are specified beforehand.

Specifically, the conditions decision portion 540 monitors the operating state of the management server 5 and, if the specified conditions are met, instructs the notification destination information insertion portion 560 to insert the notification destination information. The specified conditions will be met if any one of the load on a CPU of the management server 5A itself, the number of the management terminals, and the number of the simultaneously connected terminals exceeds its preset threshold value, or if a specified time registered beforehand in the management server 5A is reached.

The notification destination information insertion portion 560 inserts notification destination change information for changing a notification destination of the notification data. Further, the notification destination information insertion portion 560 inserts the notification destination change information into the return information for the notification data received from the client terminal 7 later than the timing determined by the conditions decision portion 540.

Specifically, the notification destination information insertion portion 560 inserts the notification-data notification destination information posted from the terminal management portion 520 into the return information for the client terminal 7A after it is instructed by the conditions decision portion 540 to do so.

Figure 3:
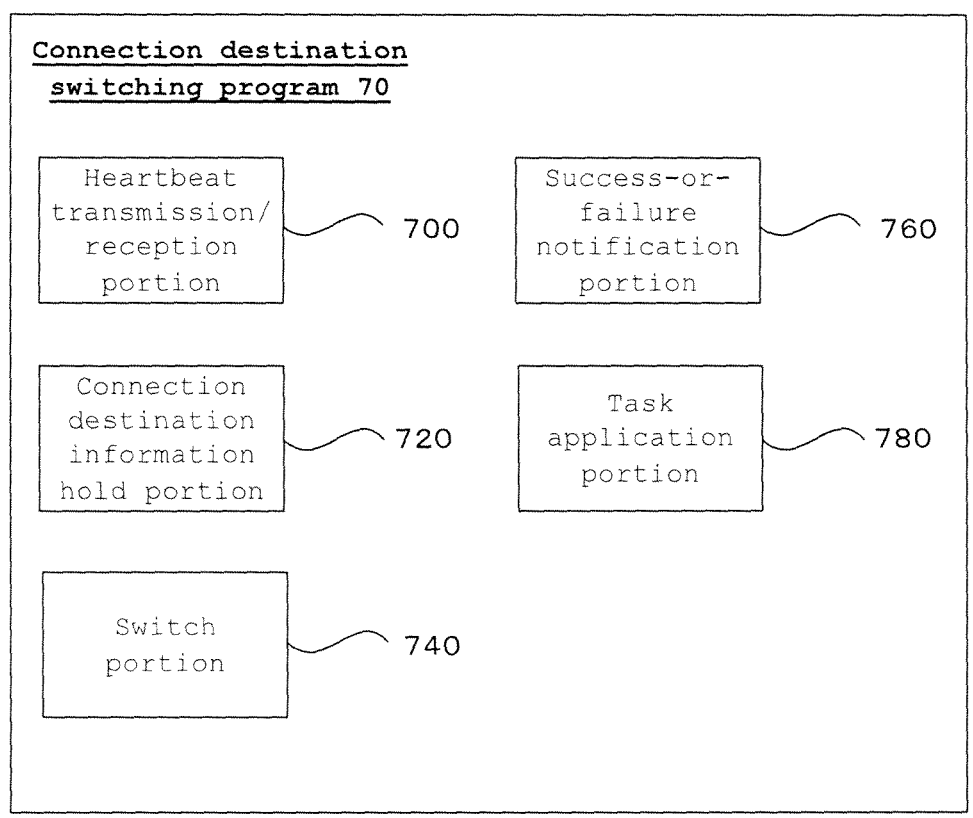
FIG. 3 is an explanatory diagram of a configuration of a connection destination switching program 70 of the data communication system 1.

FIG. 3 is an explanatory diagram of the functional configuration of a connection destination switching program 70 of the data communication system 1.

As illustrated in FIG. 3, the connection destination switching program 70 has a heartbeat transmission/reception portion 700, a connection destination information hold portion 720, a switch portion 740, a success-or-failure notification portion 760, and a task application portion 780.

The connection destination switching program 70 is installed to the client terminal 7 from a recording medium such as a CD-ROM, for example.

The heartbeat transmission/reception portion 700 transmits notification data denoting at least the operating state to the terminal management device.

Specifically, the heartbeat transmission/reception portion 700 transmits information posted from any other configuration to the management server 5A as a heartbeat.

In the present example, the heartbeat transmission/reception portion 700 monitors the operating state of the client terminal 7A (its own machine) and periodically transmits to the management server 5A the heartbeat denoting the client terminal 7A in accordance with the notification-data notification destination information held in the connection destination information hold portion 720.

Moreover, the heartbeat transmission/reception portion 700 transmits a success-or-failure notification which is posted from the success-or-failure notification portion 760 and task downloading results as well as task application results which are posted from the task application portion 780 to the management server 5A in accordance with the notification-data notification destination information held in the connection destination information hold portion 720.

Further, if having received notification destination change information from the management server 5A, the heartbeat transmission/reception portion 700 posts the notification destination change information to the switch portion 740.

The connection destination information hold portion 720 holds information which is used to gain access to a switching-source device and information which is used to gain access to a switching-destination device. That is, the connection destination information hold portion 720 holds notification-data notification destination information of the switching-source management server 5A and notification-data notification destination information of the switching-destination management server 5B.

More specifically, the connection destination information hold portion 720 holds an IP address of the next heartbeat notification-destination management server 5B posted from the management server 5A as the notification-data notification destination information and an IP address of the original heartbeat notification-destination management server 5A as old notification destination information.

The switch portion 740 switches the notification destination of the posted data based on the returned information for the posted data transmitted from the terminal management device.

Specifically, the switch portion 740 updates the notification-data notification destination information and the old notification destination information. For example, the notification destination change information posted from the heartbeat transmission/reception portion 700 is stored in the connection destination information hold portion 720 as the notification-data notification destination information, which is the next heartbeat notification destination information. In this case, the notification-data notification destination information before being updated is stored in the connection information hold portion 720 as the old notification destination information.

Further, if the heartbeat transmission/reception portion 700 fails in transmission of notification data to the notification-data notification destination information of the switching destination device, the switch portion 740 switches the transmission destination of the notification data from the notification-data notification destination information of the switching destination device to the notification-data notification destination information of the terminal management device.

Specifically, if having been notified of failure in posting of a heartbeat to the next notification-data notification destination information from the success-or-failure notification portion 760, the switch portion 740 updates the notification-data notification destination information held in the connection destination information hold portion 720 with the old notification destination information.

If the heartbeat transmission/reception portion 700 transmits the notification data to the switching destination device, the success-or-failure notification portion 760 notifies the management server 5A of success or failure in transmission of the notification data to the switching destination device.

Specifically, the success-or-failure notification portion 760 notifies the heartbeat transmission/reception portion 700 that it should transmit success or failure in transmission of the heartbeat sent to the management server 5B from the heartbeat transmission/reception portion 700 to the IP address of the management server 5A, which is the old notification information, based on the notification-data notification destination information.

If task file download destination information is contained in the return information sent back from the management server 5, the task application portion 780 gains access to a destination that corresponds to the task file download destination information, downloads a data file in accordance with a communication method specified by the task file download destination information, and executes the downloaded data file.

Further, the task application portion 780 notifies the management server 5A of success or failure in downloading of the task information and that in application of the task.

Specifically, if the task information is contained in the return information for the heartbeat, the task application portion 780 decides whether the task file download destination information is contained in the task information. If the task file download destination information is contained, the task application portion 780 gains access to an external device in accordance with the task file download destination information, downloads the data file from the external device, and executes the task using the downloaded data file.

Further, the task application portion 780 notifies the heartbeat transmission/reception portion 700 that it should notify the management server 5A of results of downloading the data file required for execution of the task and results of applying the task based on the notification destination information.

Figure 4:
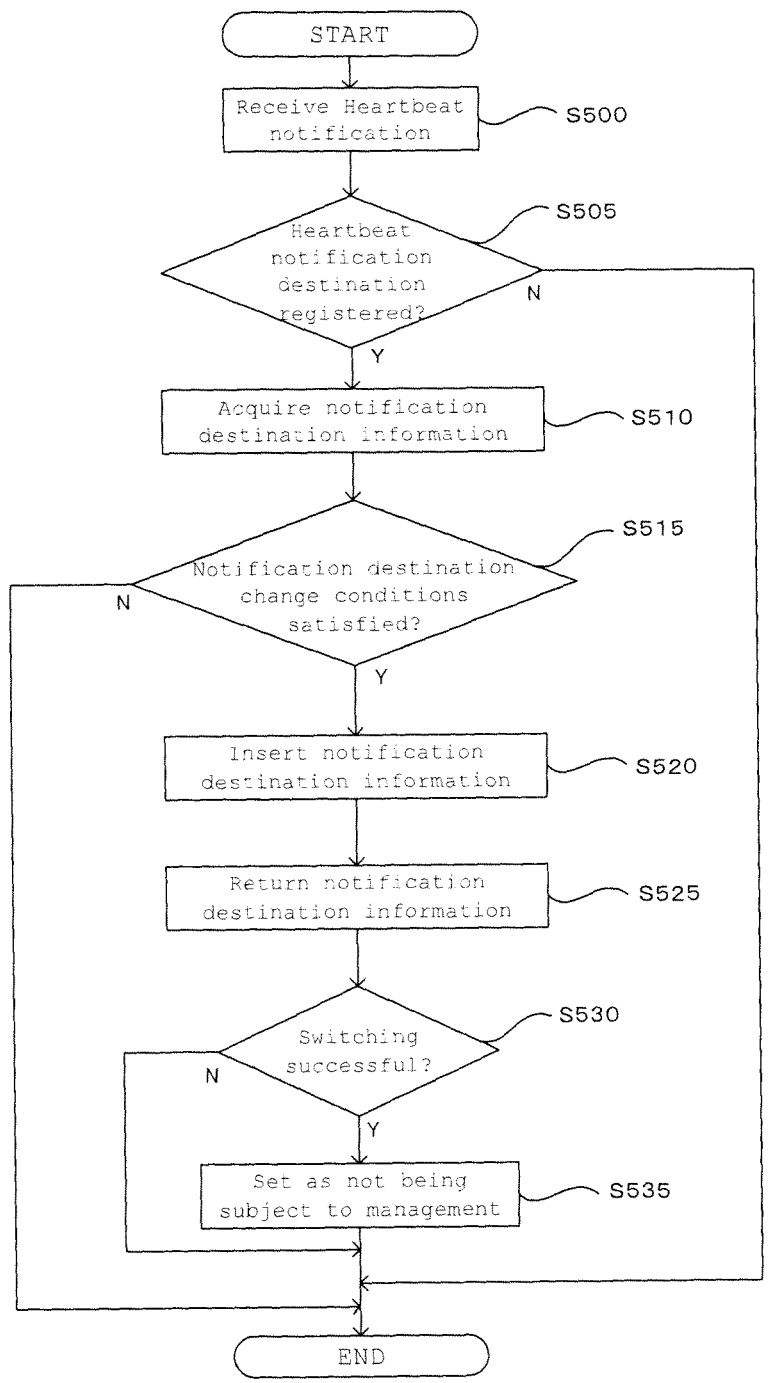
FIG. 4 is an explanatory flowchart of connection destination notification processing for client (S50)

FIG. 4 is an explanatory flowchart of connection destination notification processing for client (S50).

As illustrated in FIG. 4, in step 500 (S500), the heartbeat transmission/reception portion 500 receives a heartbeat transmitted from the client terminal 7A. The heartbeat transmission/reception portion 500 posts the received heartbeat to the terminal management portion 520.

In step 505 (S505), the terminal management portion 520 checks whether notification-data notification destination information of the heartbeat transmission source client terminal 7A is registered in the terminal management information table. If it is registered, the connection destination notification processing for client (S50) shifts to S510. If it is not registered, the connection destination notification processing for client (S50) ends.

In step 510 (S510), the terminal management portion 520 acquires the notification-data notification destination information of the client terminal 7A from the terminal management information table. The terminal management portion 520 posts the acquired notification-data notification destination information to the notification destination insertion portion 560.

In step 515 (S515), the conditions decision portion 540 decides whether the operating state of the management server 5A meets notification destination change conditions. If the conditions are met, the connection destination notification processing for client (S50) shifts to S520. If the conditions are not met, the connection destination notification processing for client (S50) ends.

In step 520 (S520), the notification destination information insertion portion 560 inserts the notification-data notification destination information posted from the terminal management portion 520 into return information for the client terminal 7A. The notification destination information insertion portion 560 notifies the heartbeat transmission/reception portion 500 of the return information in which the notification-data notification destination information is inserted.

In step 525 (S525), the heartbeat transmission/reception portion 500 returns to the client terminal 7A the return information posted from the notification destination information insertion portion 560.

In step 530 (S530), the heartbeat transmission/reception portion 500 receives a notification of success or failure in server switching from the client terminal 7A. The heartbeat transmission/reception portion 500 posts the success-or-failure notification to the terminal management portion 520. If success is posted, the connection destination notification processing for client (S50) shifts to S535. If failure is posted, the connection destination notification processing for client (S50) ends.

In step 535 (S535), the terminal management portion 520 updates the terminal management table with the success-or-failure notification transmission source client terminal 7A not being subject to management.

Figure 5:
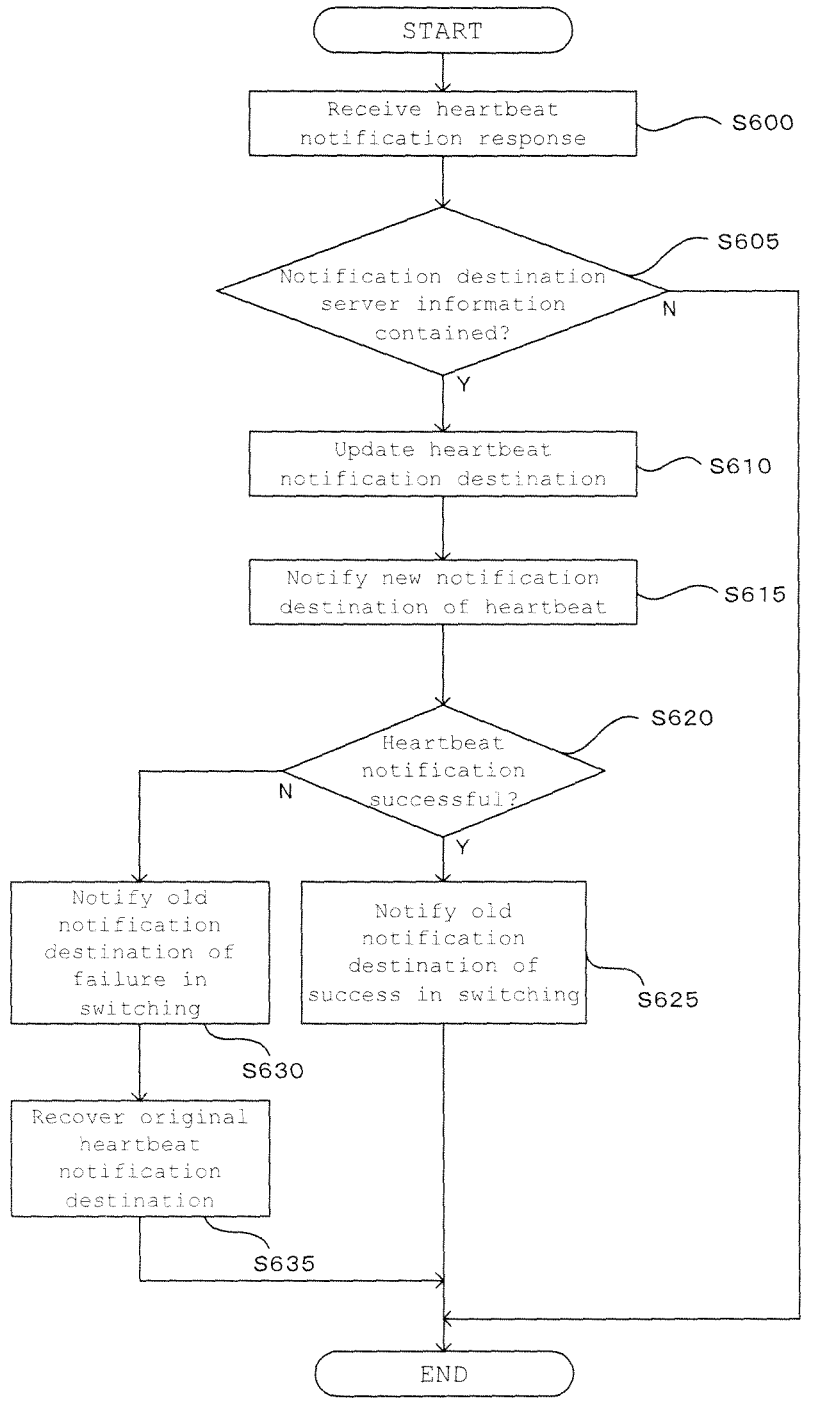
FIG. 5 is an explanatory flowchart of heartbeat notification destination switching processing for client (S60)

FIG. 5 is an explanatory flowchart of heartbeat notification destination switching processing (S60).

As illustrated in FIG. 5, in step 600 (S600), the heartbeat transmission/reception portion 700 receives a heartbeat notification response from the management server 5A. The heartbeat transmission/reception portion 700 posts the heartbeat notification response to the switch portion 740.

In step 605 (S605), the switch portion 740 checks whether notification-data notification destination information is contained in the heartbeat notification response posted from the transmission/reception portion 700. If the notification-data notification destination information is contained, the heartbeat notification destination switching processing (S60) shifts to S610. If it is not contained, the heartbeat notification destination switching processing (S60) ends.

In step 610 (S610), the switch portion 740 stores the notification-data notification destination information posted from the heartbeat transmission/reception portion 700 in the connection destination information hold portion 720 as the next heartbeat notification destination information and also stores the earlier notification-data notification destination information in the connection destination information hold portion as the old notification destination information.

In step 615 (S615), to transmit the next heartbeat notification to the management server 5B, the heartbeat transmission/reception portion 700 notifies the management server 5B of the heartbeat based on the notification-data notification destination information in the connection destination information hold portion 720. Moreover, the heartbeat transmission/reception portion 700 notifies the success-or-failure notification portion 760 of success or failure in heartbeat notification.

In step 620 (S620), if the heartbeat is successfully posted by the heartbeat transmission/reception portion 700 to the management server 5B, the heartbeat notification destination switching processing (S60) shifts to S625. In the case of failure in posting of the heartbeat to the management server 5B, the heartbeat notification destination switching processing (S60) shifts to S630.

In step 625 (S625), the success-or-failure notification portion 760 instructs the heartbeat transmission/reception portion 700 to notify of the success in posting of the heartbeat to the management server 5B based on the old notification destination information stored in the connection destination information hold portion 720. The heartbeat transmission/reception portion 700 notifies the old notification destination information of the success in posting of the heartbeat to the management server 5B.

In step 630 (S630), the success-or-failure notification portion 760 instructs the heartbeat transmission/reception portion 700 to notify of the failure in posting of the heartbeat to the management server 5B based on the old notification destination information stored in the connection destination information hold portion 720. The heartbeat transmission/reception portion 700 notifies the old notification destination information of the failure in posting of the heartbeat to the management server 5B. Moreover, the success-or-failure notification portion 760 notifies the switch portion 740 of the failure in posting of the heartbeat to the management server 5B.

In step 635 (S635), the switch portion 740 updates the notification-data notification destination information with the old notification destination information.

Figure 6:
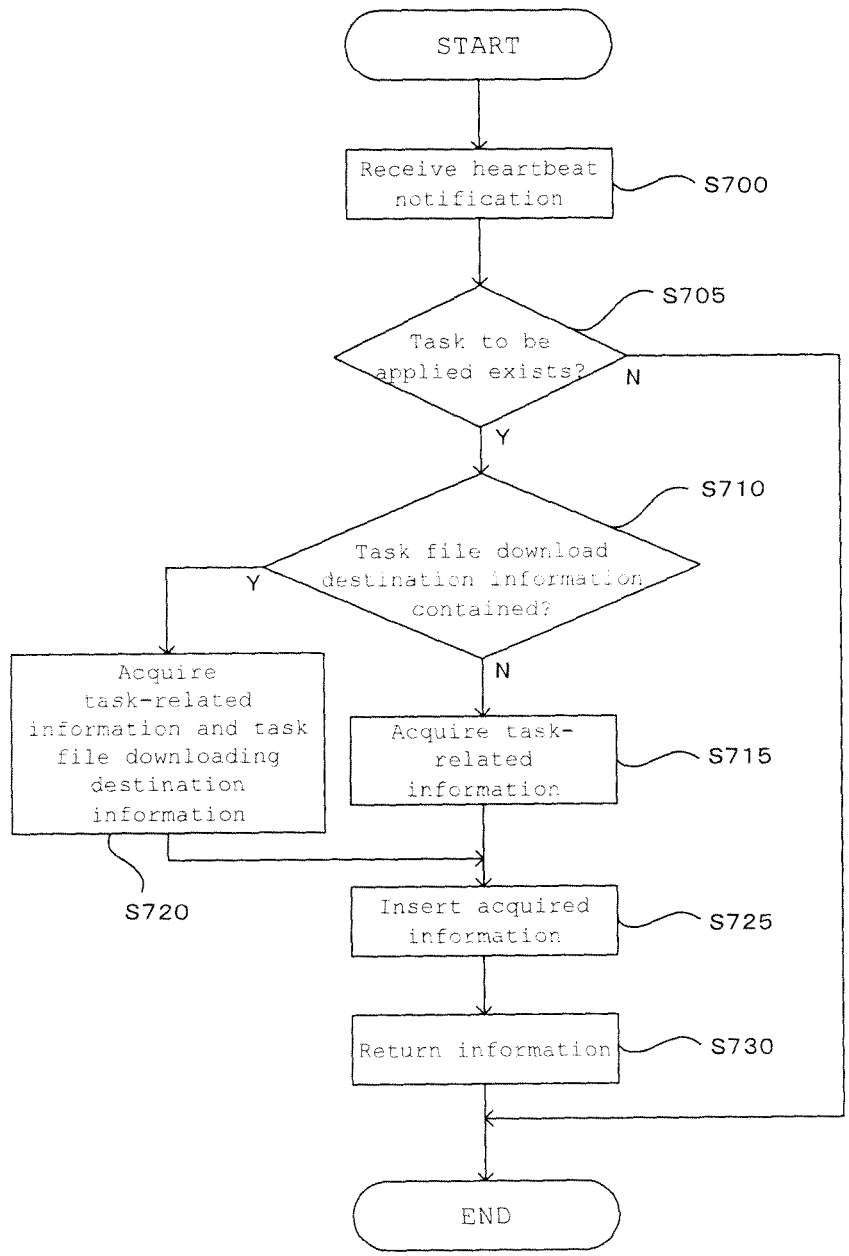
FIG. 6 is an explanatory flowchart of task information return processing for client (S70)

FIG. 6 is an explanatory flowchart of task information return processing for client (S70).

As illustrated in FIG. 6, in step 700 (S700), the heartbeat transmission/reception portion 500 in the management server 5A receives a heartbeat notification from the client terminal 7A.

The heartbeat transmission/reception portion 500 notifies the terminal management portion 520 of the heartbeat notification from the client terminal 7A.

In step 705 (S705), the terminal management portion 520 checks whether task information which is posted from the heartbeat transmission/reception portion 500 and to be related to the client terminal 7A is registered in the terminal management information table. If the task information is registered, the task information return processing for client (S70) shifts to S710. If the task information is not registered, the task information return processing for client (S70) ends.

In step 710 (S710), the terminal management portion 520 confirms information of the download destination of a task file to be related to the client terminal 7A, in the terminal management table. If the task file download destination information is not registered, the task information return processing for client (S70) shifts to S715. If the task file download destination information is registered, the task information return processing for client (S70) shifts to S720.

In step 715 (S715), the terminal management portion 520 acquires task-related information from the terminal management information table. The terminal management portion 520 posts the acquired task-related information to the notification destination information insertion portion 560.

In step 720 (S720), the terminal management portion 520 acquires the task-related information and applied-task file download destination information from the terminal management information table. The terminal management portion 520 notifies the notification destination information insertion portion 560 of the acquired task file download destination information and the task-related information.

In step 725 (S725), the notification destination information insertion portion 560 inserts the task-related information or the task-related information and the task file download destination information which are posted from the terminal management portion 520, into return information for the client terminal 7A. The notification destination information insertion portion 560 instructs the heartbeat transmission/reception portion 500 to send the return information back to the client terminal 7A.

In step 730 (S730), the heartbeat transmission/reception portion 500 sends back to the client terminal 7A the return information posted from the notification destination information insertion portion 560.

Figure 7:
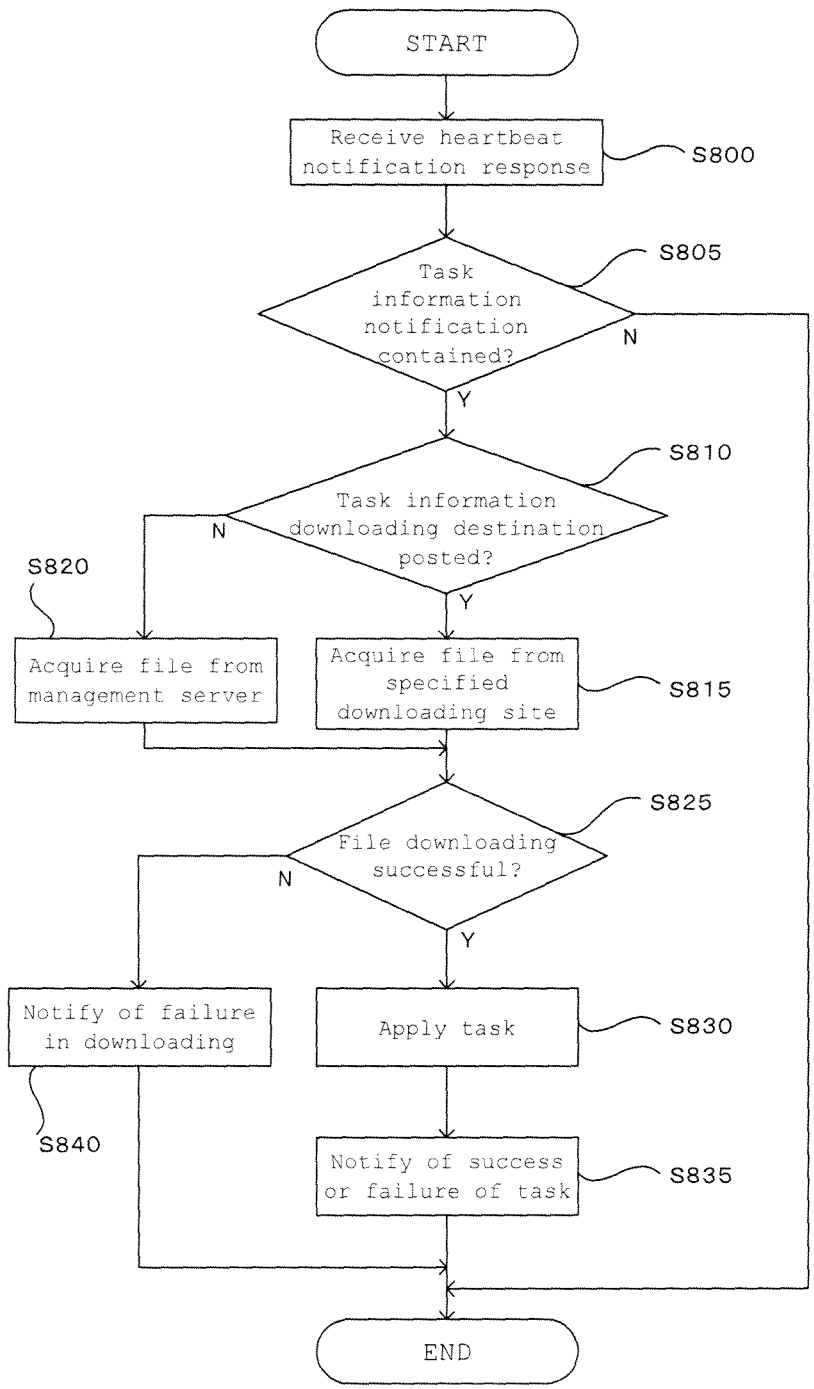
FIG. 7 is an explanatory flowchart of task application processing for client (S80).

FIG. 7 is an explanatory flowchart of task application processing for client (S80).

As illustrated in FIG. 7, in step 800 (S800), the heartbeat transmission/reception portion 700 receives a heartbeat notification response from the management server 5A.

In step 805 (S805), if task information is contained in the heartbeat notification response, the task application processing for client (S80) shifts to S810. If no task information is contained in the heartbeat notification response, the task application processing for client (S80) ends.

In step 810 (S810), if task file download destination information is contained in the heartbeat notification response, the task application processing for client (S80) shifts to S815. If no download destination information of task information is contained in the heartbeat notification response, the task application processing for client (S80) shifts to S820.

In step 815 (S815), the task application portion 780 gains access to an external device to download a data file in accordance with the task file downloading information.

In step 820 (S820), the task application portion 780 connects to the management server 5A to download the data file in accordance with the notification-data notification destination information held in the connection destination information hold portion 720.

In step 825 (S825), if the data file is successfully downloaded, the task application processing for client (S80) shifts to S830. In the case of failure in downloading of the data file, the task application processing for client (S80) shifts to S840.

In step 830 (S830), the task application portion 780 executes a task by using the downloaded data file.

In step 835 (S835), the task application portion 780 notifies the heartbeat transmission/reception portion 700 of the results of application of the task. The heartbeat transmission/reception portion 700 posts the task application results to the management server 5A in accordance with the notification-data notification destination information held in the connection destination information hold portion 720.

In step 840 (S840), the task application portion 780 instructs the heartbeat transmission/reception portion 700 to notify of failure in downloading of the data file. The heartbeat transmission/reception portion 700 notifies the management server 5A of the failure in downloading of the task file posted from the task application portion 780, in accordance with the notification-data notification destination information held in the connection destination information hold portion 720.

As described above, the data communication system 1 of the present embodiment includes the client terminals 7 and the management servers 5 which manage the client terminals 7. The client terminal 7 periodically notifies the management server 5 of the operating state of its own machine by using a heartbeat. The management server 5 manages the operating state of that machine and, if specified conditions are met, inserts the next notification-data notification destination information and task information of the client terminal 7 into heartbeat return information for the client terminal 7 and sends it back to the client terminal 7. The specified conditions are preset by a manager. Based on the heartbeat notification destination and the task file download destination information contained in the return information, the client terminal 7 connects to the server in order to notify of the heartbeat and download a task file. Thus, by dynamically switching the server connection destination of the client terminal 7 before loads on the management server 5 increase, the loads on the management server 5 can be distributed. Further, the system is well suited for use in maintenance of the management servers. Further, the management server 5 can also assign only some of its functions such as data file delivery to any other external device, thereby distributing the loads on it.

Next, a description will be given of variants of the embodiment.

Although in the embodiment the notification-data notification destination information has been directly registered to the management server 5 manually by the manager, the invention is not limited to it; for example, any other information processing device that can be a heartbeat notification destination could notify the management server of its own information such that the information might be registered in it. Although the task information has been registered to the management server 5 by the manager, the invention is not limited to it; for example, any equipment to which a task file is downloaded could notify the management server 5 of task file download destination information such that the information might be registered in it.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   an information processing device; and
   a terminal management device that manages the information processing device, wherein:
   the information processing device includes:
      a transmission section that transmits heartbeat notification data denoting at least an operating state to the terminal management device; and
      a switch section that switches a notification destination of the heartbeat notification data, based on return information for the heartbeat notification data transmitted from the transmission section, the terminal management device includes:
- a return section that sends back the return information in response to the heartbeat notification data transmitted from the information processing device;
- a notification destination information insertion section that inserts notification destination change information for changing the notification destination of the heartbeat notification data into the return information sent back by the return section; and
- a condition decision section that instructs the notification destination information insertion section to insert the notification destination change information if any one of (i) load on a CPU of the terminal management device itself, (ii) a number of managed information processing devices, and (iii) a number of simultaneously connected information processing devices, exceeds a preset threshold value, and the notification destination information insertion section inserts the notification destination change information into the return information for the heartbeat notification data received from the information processing device at a timing later than a timing instructed by the condition decision section.

2. The information processing system according to claim 1, wherein:
the notification destination information insertion section inserts the notification destination change information into the return information for the heartbeat notification data received from the information processing device later than the timing determined by the condition decision section.

3. The information processing system according to claim 1, wherein:
the information processing device further includes a connection destination information hold section that holds a heartbeat notification-data notification destination information for realization of communication to the terminal management device and heartbeat notification-data notification destination information of a switching destination which is switched on the basis of the notification destination change information, and if notification of the heartbeat notification data to the notification destination based on the notification destination change information fails, the transmission section returns the notification destination of the heartbeat notification data to the terminal management device by using the heartbeat notification-data notification destination information held in the connection destination information hold section.

4. The information processing system according to claim 1, wherein the information processing device further includes a success-or-failure notification section which, if the notification destination of the heartbeat notification data is switched by the switch section, notifies the terminal management device of success or failure in posting of the heartbeat notification data to the switched destination.

5. The information processing system according to claim 4, wherein:
the terminal management device further includes a terminal management section that manages terminal management information containing at least identification information of the information processing device to be managed, and the terminal management section updates the managed terminal management information depending on success or failure posted from the success-or-failure notification section.

6. An information processing system comprising:
an information processing device; and
a terminal management device that manages the information processing device, wherein:

the information processing device includes:
- a transmission section that transmits heartbeat notification data denoting at least an operating state to the terminal management device;
- a switch section that switches an access destination based on return information for the heartbeat notification data transmitted from the transmission section; and
- a task application section that acquires information which is used in execution of a task from the access destination switched by the switch section; and the terminal management device includes:
- a return section that sends back return information for the heartbeat notification data transmitted from the information processing device;
- a notification destination information insertion section that inserts notification destination change information for changing the access destination into the return information sent back by the return section; and
- a condition decision section that instructs the notification destination information insertion section to insert the notification destination change information if any one of (i) load on a CPU of the terminal management device itself, (ii) a number of managed information processing devices, and (iii) a number of simultaneously connected information processing devices, exceeds a preset threshold value, and the notification destination information insertion section inserts the notification destination change information into the return information for the heartbeat notification data received from the information processing device at a timing later than a timing instructed by the condition decision section.

7. The information processing system according to claim 6, wherein:
the notification destination information insertion section inserts information of attributes of a task and download destination information which specifies a download site of a data file required to execute the task, into the return information, and the task application section downloads the data file from the download site specified in the download destination information inserted by the notification destination information insertion section and executes the task by using the downloaded data file.

8. The information processing system according to claim 7, wherein the task application section notifies the terminal management device of success or failure in downloading of the data file required by the task and success or failure in application of the task.

9. A terminal management device comprising:
a return section that sends back return information in response to heartbeat notification data which denotes an operating state transmitted from an information processing device;

a notification destination information insertion section that inserts notification destination change information for changing a notification destination of the heartbeat notification data, into the return information; and a condition decision section that instructs the notification destination information insertion section to insert the notification destination change information if any one of (i) load on a CPU of the terminal management device itself, (ii) a number of information processing devices managed by the terminal management device, and (iii) a number of simultaneously connected information processing devices, exceeds a preset threshold value, wherein the notification destination information insertion section inserts the notification destination change information into the return information for the heartbeat notification data received from the information processing device at a timing_later than a timing instructed by the condition decision section.

10. A terminal management device comprising:

a return section that sends back return information in response to heartbeat notification data which denotes an operating state transmitted from an information processing device;

a notification destination information insertion section that inserts download destination information which specifies a download site of a data file, into the return information sent back by the return section; and a condition decision section that instructs the notification destination information insertion section to insert the download destination information if any one of (i) load on a CPU of the terminal management device itself, (ii) a number of information processing devices managed by the terminal management device, and (iii) a number of simultaneously connected information processing devices, exceeds a preset threshold value, wherein the notification destination information insertion section inserts the download destination information into the return information for the heartbeat notification data received from the information processing device at a timing later than a timing instructed by the condition decision section.

11. A non-transitory computer-readable medium storing thereon a computer program that, when executed by a computer, causes the computer to perform steps of:

inserting notification destination change information for changing a notification destination of heartbeat notification data into return information in response to heartbeat notification data received from an information processing device; and sending back the return information in which the notification destination change information is inserted to the information processing device, wherein the notification destination change information is inserted if any one of (i) load on a CPU of the terminal management device itself, (ii) a number of information processing devices managed by the terminal management device, and (iii) a number of simultaneously connected information processing devices, exceeds a preset threshold value.

12. A non-transitory computer-readable medium storing thereon a computer program that, when executed by a computer, causes the computer to perform steps of:

inserting download destination information which specifies a download site of a data file, into return information in response to heartbeat notification data received from an information processing device; and sending back the return information in which the download destination information is inserted to the information processing device, wherein the download destination information is inserted if any one of (i) load on a CPU of a terminal management device itself, (ii) a number of information processing devices managed by the terminal management device, and (iii) a number of simultaneously connected information processing devices, exceeds a preset threshold value.

* * * * *